(12) United States Patent
Tseng

(10) Patent No.: US 11,904,591 B2
(45) Date of Patent: Feb. 20, 2024

(54) COMPOSITE MATERIAL FOR FOOTWEAR

(71) Applicant: Kai-Hsi Tseng, Changhua County (TW)

(72) Inventor: Kai-Hsi Tseng, Changhua County (TW)

( * ) Notice: Subject to any disclaimer, the term of this patent is extended or adjusted under 35 U.S.C. 154(b) by 67 days.

(21) Appl. No.: 17/070,233

(22) Filed: Oct. 14, 2020

(65) Prior Publication Data

US 2021/0023816 A1 Jan. 28, 2021

Related U.S. Application Data

(63) Continuation-in-part of application No. 16/121,001, filed on Sep. 4, 2018, now abandoned.

(51) Int. Cl.
*B32B 5/26* (2006.01)
*B32B 27/12* (2006.01)
(Continued)

(52) U.S. Cl.
CPC ............... *B32B 5/26* (2013.01); *A43B 1/14* (2013.01); *A43B 13/026* (2013.01); *A43B 13/12* (2013.01);
(Continued)

(58) Field of Classification Search
CPC ......... B32B 5/26; B32B 5/12; B32B 2250/03; B32B 2250/20; B32B 2250/40; B32B 2260/023; B32B 2260/046; B32B 2262/0269; B32B 2262/101; B32B 2262/106; B32B 2307/546; B32B 2307/554; B32B 2437/02; B32B 27/286; B32B 27/281; B32B 27/32; B32B 27/34; B32B 2250/05; B32B 2262/10; B32B 2262/12; B32B 5/024; B32B 3/04; B32B 5/08; B32B 27/12; B32B 27/302; B32B 27/365; B32B 2262/02; B32B 2270/00; B32B 2307/402; B32B 2307/51; B32B 2307/536; B32B 2307/54; B32B 27/285;
(Continued)

(56) References Cited

U.S. PATENT DOCUMENTS

2005/0277743 A1\* 12/2005 Nozaki ................. B32B 15/043
525/403
2010/0028593 A1\* 2/2010 Taketa ...................... B32B 5/26
428/113
(Continued)

FOREIGN PATENT DOCUMENTS

WO WO-2016111190 A1 \* 7/2016 ............. B29C 70/20

*Primary Examiner* — Brian Handville
(74) *Attorney, Agent, or Firm* — Sinorica International Patent and Trademark

(57) ABSTRACT

Provided is a composite material for footwear. The composite material comprises a first carbon fiber layer, a second carbon fiber layer, and an intermediate layer. The first carbon fiber layer comprises carbon fibers. The second carbon fiber layer comprises carbon fibers, and the second carbon fiber layer is disposed above the first carbon fiber layer. The intermediate layer comprises liquid crystal polymer fibers; and the intermediate layer is disposed between the first carbon fiber layer and the second carbon fiber layer. The composite material for footwear has good bendability and good wear resistance to enhance the quality of the sole or shoe boards made from the composite material.

16 Claims, 2 Drawing Sheets

(51) Int. Cl.
 B32B 27/18 (2006.01)
 B32B 27/40 (2006.01)
 B32B 5/02 (2006.01)
 B32B 9/04 (2006.01)
 A43B 13/02 (2022.01)
 A43B 13/12 (2006.01)
 A43B 1/14 (2006.01)
 B32B 27/08 (2006.01)

(52) U.S. Cl.
 CPC .............. *B32B 5/024* (2013.01); *B32B 9/047* (2013.01); *B32B 27/08* (2013.01); *B32B 27/12* (2013.01); *B32B 27/18* (2013.01); *B32B 27/40* (2013.01); *B32B 2250/03* (2013.01); *B32B 2250/04* (2013.01); *B32B 2250/05* (2013.01); *B32B 2250/20* (2013.01); *B32B 2250/24* (2013.01); *B32B 2260/046* (2013.01); *B32B 2262/0269* (2013.01); *B32B 2262/101* (2013.01); *B32B 2262/106* (2013.01); *B32B 2307/54* (2013.01); *B32B 2307/546* (2013.01); *B32B 2307/554* (2013.01); *B32B 2375/00* (2013.01); *B32B 2437/02* (2013.01)

(58) Field of Classification Search
 CPC .. B32B 27/40; A43B 1/14; A43B 5/00; A43B 13/026; A43B 13/04; A43B 13/12
 See application file for complete search history.

(56) References Cited

U.S. PATENT DOCUMENTS

| | | | |
|---|---|---|---|
| 2011/0113534 A1* | 5/2011 | Sauer | B32B 7/04 428/212 |
| 2012/0202004 A1* | 8/2012 | Beraud | D04H 1/559 428/113 |
| 2012/0227282 A1* | 9/2012 | Hawkinson | D04H 3/009 442/415 |
| 2018/0002504 A1* | 1/2018 | Kawamoto | B29C 70/20 |

* cited by examiner

COMPOSITE MATERIAL FOR FOOTWEAR

BACKGROUND OF THE INVENTION

1. Field of the Invention

The present invention relates to the technical field of a composite material, more particularly to a composite material for footwear.

2. Description of the Prior Arts

Major materials for footwear on the market are epoxy resins and thermoplastic polyurethane (TPU), both of which have been used for about 20 years. Epoxy resins and/or TPU materials can relieve the pressure on feet and improve the wearing comfort in wear. Therefore, they are widely used in various kinds of athletic shoes and sneakers, such as golf shoes, basketball shoes, soccer shoes, cycling shoes and jogging shoes.

However, when shoes made from the foresaid conventional materials are used over a period, they are easily deteriorated or aged due to environmental factors such as temperature changes, humidity changes, and solar radiation. When subjected to an external force of friction, impact, or bending beyond the maximum endurable force, the sole or heels would be broken. As a result, the user may get injured during the motion because of the breakage of the sole or the heels.

Therefore, there is still a need to improve the material for footwear.

SUMMARY OF THE INVENTION

In view of the above-mentioned drawbacks of the prior arts, one objective of the present invention is to provide a composite material for footwear. The composite material for footwear has good bendability and good wear resistance, so as to improve the quality of the footwear and extend the service life. Therefore, the safety of the wearer is improved. To achieve the foresaid objective, the present invention provides a composite material comprising a first carbon fiber layer, a second carbon fiber layer, and an intermediate layer. The first carbon fiber layer comprises carbon fibers. The second carbon fiber layer comprises carbon fibers, and the second carbon fiber layer is disposed above the first carbon fiber layer. The intermediate layer comprises liquid crystal polymer fibers; and the intermediate layer is disposed between the first carbon fiber layer and the second carbon fiber layer.

By the above technical means, the carbon fibers of the first and second carbon fiber layers with higher mechanical strength can maintain the structural stability of the shoes so as to protect the wearers' feet. The intermediate layer has a good cushioning ability and high wear resistance, so it acts as an auxiliary to enhance flexibility and cushioning ability of footwear. Specifically, the first carbon fiber layer is a first carbon fiber cloth impregnated with a first resin, in which the first carbon fiber cloth comprises carbon fibers. Similarly, the second carbon fiber layer is a second carbon fiber cloth impregnated with a second resin, in which the second carbon fiber cloth comprises carbon fibers.

Specifically, the intermediate layer is a liquid crystal polymer fiber cloth impregnated with a third resin, in which the liquid crystal polymer fiber cloth comprises liquid crystal polymer fibers.

In some cases, the composite material for footwear of the present invention further comprises a resin body, wherein the first carbon fiber layer, the second carbon fiber layer, and the intermediate layer are optionally enclosed by a resin body. Preferably, the resin body is composed of a fourth resin comprising a polyamide resin (PA), a thermoplastic polyurethane resin (TPU), a polyetherimide resin (PEI), a polysulfone resin (PSU), a polyphenylene sulfone resin (PPSU), a polyethylene resin (PE), a polycarbonate resin (PC), an acrylonitrile-butadiene-styrene resin (ABS), or any combination thereof.

More specifically, the polyamide resin comprises Polyamide 6 (i.e. Nylon 6) or Polyamide 66 (i.e. Nylon 66). Polyamide 6 is synthesized by ring-opening polymerization of ε-carprolactam, and Polyamide 66 is synthesized by polycondensation of equivalent amounts of hexamethylenediamine and adipic acid.

The composite material can be modified according to the various applications of the shoes. Adjusting the arrangement of the carbon fibers, mixing different materials of fibers with carbon fibers, or using different resins can be adopted to meet the needs of the tensile strength, structural stability, elasticity or hardness, and so on. For example, basketball shoes need to have good shock absorption, stability and elasticity; running shoes need to have a good flexibility and good elasticity; ice skates need to have a desired hardness to prevent the reverse insertion of blades.

To strengthen or improve the properties of the composite material, the first carbon fiber layer or the second carbon fiber layer can further comprise additional kinds of fibers by mixed weaving or blended spinning. That is, the first carbon fiber cloth or the second carbon fiber cloth comprises additional kinds of fibers, such as glass fibers or aramid fibers (i.e. poylmetaphenyleneisophthalamides, MPIA).

In some cases, the first carbon fiber layer can further comprise an inorganic fiber such as a glass fiber. In some cases, the first carbon fiber layer can further comprise an aramid fiber. Similarly, the second carbon fiber layer can further comprise an aramid fiber or an inorganic fiber such as a glass fiber. In the first carbon fiber layer and/or the second carbon fiber layer, the amount of the additional fibers is equal to or less than the amount of the carbon fibers.

Specifically, the first carbon fiber cloth may further comprise glass fibers, aramid fibers, or any combination thereof. Similarly, the second carbon fiber cloth also may further comprise glass fibers, aramid fibers, or any combination thereof.

Preferably, the first carbon fiber cloth and the second carbon fiber cloth independently have a density of 45 grams per square meter (gsm) to 272 gsm. Preferably, the first resin and the second resin independently comprise a polyamide resin (PA), a polyurethane resin (PU) such as a thermoplastic polyurethane resin (TPU), a polysulfone resin (PSU), a polyphenylene sulfone resin (PPSU), or any combination thereof. The first resin and the second resin can be the same or different. In some cases, the combination of the first resin and the second resin (expressed in the first resin/second resin) in the composite material is selected from the group consisting of PA/PA, PA/PU, PA/TPU, PA/PSU, PA/PPSU, PU/PA, PU/PU, PU/TPU, PU/PSU, PU/PPSU, TPU/PA, TPU/PU, TPU/TPU, TPU/PSU, TPU/PPSU, PSU/PA, PSU/PU, PSU/TPU, PSU/PSU, PSU/PPSU, PPSU/PA, PPSU/PU, PPSU/TPU, PPSU/PSU, PPSU/PPSU.

Preferably, the first resin is in an amount of 38 percent by weight (wt %) to 55 wt % based on the total weight of the first carbon fiber layer, depending on the thickness of the first carbon fiber layer; such as 38 wt %, 40 wt %, 42 wt %, 50 wt % or 55 wt %. Preferably, the second resin is in an amount of 38 wt % to 55 wt % based on the total weight of the second carbon fiber layer, depending on the thickness of the second carbon fiber layer; such as 38 wt %, 40 wt %, 42 wt %, 50 wt % or 55 wt %.

In some cases, the intermediate layer further comprises aramid fibers, in which the amount of the aramid fibers is equal to or less than the amount of the liquid crystal polymer fibers.

Specifically, the liquid crystal polymer fiber cloth further comprises aramid fibers, in which the amount of the aramid fibers is equal to or less than the amount of the liquid crystal polymer fibers.

Preferably, the third resin comprises the first resin and the second resin, in which the first resin and the second resin can be the same or different. The resin impregnation of the intermediate layer occurs during the process for manufacturing the composite material of the present invention.

In one embodiment, the lower surface and the upper surface of the intermediate layer are independently modified. The modified lower and/or upper surfaces of the intermediate layer grip the first carbon fiber layer and the second carbon fiber layer well, respectively. In other words, the modified surface of the intermediate layer has a better cohesion with the adjacent first carbon fiber layer and second carbon fiber layer.

In some cases, the first carbon fiber cloth and the second carbon fiber cloth independently comprise a unidirectional (UD) carbon fiber fabric, a woven fabric, or any combination thereof.

In one embodiment, the first carbon fiber cloth is a UD carbon fiber fabric, in which the carbon fibers of the UD carbon fiber fabric are arranged in a unidirectional orientation. That is, the carbon fibers of the UD carbon fiber fabric are arranged in parallel.

In one embodiment, the first carbon fiber cloth comprises one or more layers of UD carbon fiber fabric, in which each layer of the UD carbon fiber fabric independently has its own direction of carbon fibers. That is, the directions of carbon fibers in the one or more layers of the UD carbon fiber fabric may be the same or different to each other. In addition, the density of the first carbon fiber cloth comprising the one or more layers of the UD carbon fiber fabric may be 45 gsm to 160 gsm.

In another embodiment, the first carbon fiber cloth is a woven fabric comprising a plain weave cloth, a twill weave cloth, or any combination thereof, in which the carbon fibers of the first carbon fiber layer are arranged in a multi-directional orientation. The carbon fibers of the first carbon fiber layer can be arranged at various orientations. For example, the first carbon fiber cloth can be a plain weave cloth, in which the carbon fibers are perpendicular (i.e. at an angle of 0/90 degrees off a reference axis); or, the first carbon fiber cloth can be a twill weave cloth, in which the carbon fibers are arranged at an angle of +45/−45 degrees off the reference axis, at an angle of +60/−60 degrees off the reference axis, or at any combination thereof. The reference axis is the output direction of the fibers. In addition, the density of the first carbon fiber cloth comprising the woven fabric may be 160 gsm to 272 gsm, such as 160 gsm, 180 gsm, 190 gsm, 200 gsm, 210 gsm, 220 gsm, 240 gsm, or 272 gsm.

Similarly, the second carbon fiber cloth can be a UD carbon fiber fabric, in which the carbon fibers of the UD carbon fiber fabric are arranged in a unidirectional orientation. That is, the carbon fibers of the UD carbon fiber fabric are arranged in parallel.

In one embodiment, the second carbon fiber cloth comprises one or more layers of UD carbon fiber fabric, in which each layer of the UD carbon fiber fabric independently has its own direction of carbon fibers. That is, the directions of carbon fibers in the one or more layers of UD carbon fiber fabric may be the same or different to each other. In addition, the density of the second carbon fiber cloth comprising the one or more layers of UD carbon fiber fabric may be 45 gsm to 160 gsm.

In another embodiment, the second carbon fiber cloth is a woven fabric comprising a plain weave cloth, a twill weave cloth, or any combination thereof, in which the carbon fibers of the second carbon fiber layer are arranged in a multi-directional orientation. The carbon fibers of the second carbon fiber layer can be arranged at various orientations. For example, the second carbon fiber cloth can be a plain weave cloth, in which the carbon fibers are perpendicular (i.e. at an angle of 0/90 degrees off the reference axis); or, the second carbon fiber cloth can be a twill weave cloth, in which the carbon fibers are arranged at an angle of +45/−45 degrees off the reference axis, at an angle of +60/−60 degrees off the reference axis, or at any combination thereof. The reference axis is the output direction of the fibers. In addition, the density of the second carbon fiber cloth comprising the woven fabric may be 160 gsm to 272 gsm, such as 160 gsm, 180 gsm, 190 gsm, 200 gsm, 210 gsm, 220 gsm, 240 gsm, or 272 gsm.

Specifically, when the carbon fibers are arranged at an angle of +45/−45 degrees off the reference axis, each carbon fiber of the carbon fibers is at 90 degrees or 270 degrees relative to its adjacent carbon fiber of the carbon fibers. When the carbon fibers are arranged at an angle of +60/−60 degrees off the reference axis, each carbon fiber of the carbon fibers is at 120 degrees or 240 degrees relative to its adjacent carbon fiber of the carbon fibers. More preferably, the first carbon fiber cloth or the second carbon fiber cloth comprise at least two fabrics selected from the group consisting of: a UD carbon fiber fabric (with carbon fibers arranged in a parallel way), a plain weave cloth (with carbon fibers arranged in a perpendicular way), a twill weave cloth with carbon fibers arranged in an intersecting way at an angle of +45/−45 degrees off the reference axis, a twill weave cloth with carbon fibers arranged in an intersecting way at an angle of +60/−60 degrees off the reference axis, and any combination thereof. Therefore, the composite materials can adapt to the characteristics of different types of materials for footwear, or the composite materials can comply with requirements for different force modes or different strengths of stress.

DETAILED DESCRIPTION OF THE PREFERRED EMBODIMENTS

The following embodiments are provided to demonstrate the present invention.

Composite Material with Resin Body

Figure 1:
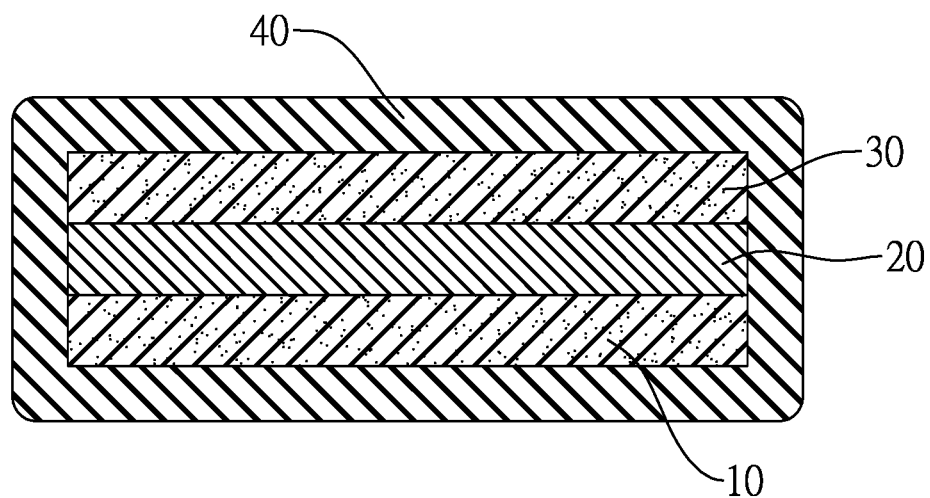
FIG. 1 is a side cross-sectional view of an embodiment of the composite material of the present invention.

As illustrated in FIG. 1, the composite material of the present invention comprises a first carbon fiber layer 10, an intermediate layer 20, a second carbon fiber layer 30, and a resin body 40. The intermediate layer 20 is disposed between the first carbon fiber layer 10 and the second carbon fiber layer 30. The resin body 40 encloses the first carbon fiber layer 10, the intermediate layer 20, and the second carbon fiber layer 30.

The major materials of the first carbon fiber layer 10 are carbon fibers. The carbon fibers are preformed into a first carbon fiber cloth. The major materials of the intermediate layer 20 are aramid fibers. The aramid fibers are preformed into an aramid fiber cloth. The intermediate layer 20 can enhance the bendability of footwear, so it can compensate for the drawback of the carbon fibers, which is highly rigid but low in bendability. The major materials of the second carbon fiber layer 30 are carbon fibers. The carbon fibers are preformed into a second carbon fiber cloth.

In another embodiment, the first carbon fiber layer may further comprise glass fibers, aramid fibers, or any combination thereof. Similarly, the second carbon fiber layer also may further comprise glass fibers, aramid fibers, or any combination thereof.

The first carbon fiber layer 10, the intermediate layer 20, and the second carbon fiber layer 30 are sequentially disposed in a mold, and then the mold is preheated. Next, Polyamide 6 is injected to wrap the first carbon fiber layer 10, the intermediate layer 20, and the second carbon fiber layer 30. After Polyamide 6 is cooled and shaped to form the resin body 40, the composite material of the present invention is obtained.

In another embodiment, Polyamide 6 may be replaced by other polyamide resin such as Polyamide 66, a thermoplastic polyurethane resin, a polyetherimide resin, polysulfone resin, a polyphenylene sulfone resin, a polyethylene resin, a polycarbonate resin, an acrylonitrile-butadiene-styrene resin, or any combination thereof.

In addition, for meeting the requirement for the appearance of the composite material for footwear, the composite material for footwear may additionally comprise other inorganic fibers or organic fibers. Moreover, the color, shape or characteristics of the composite material for footwear may be adjusted.

Composite Material without Resin Body

Figure 2:
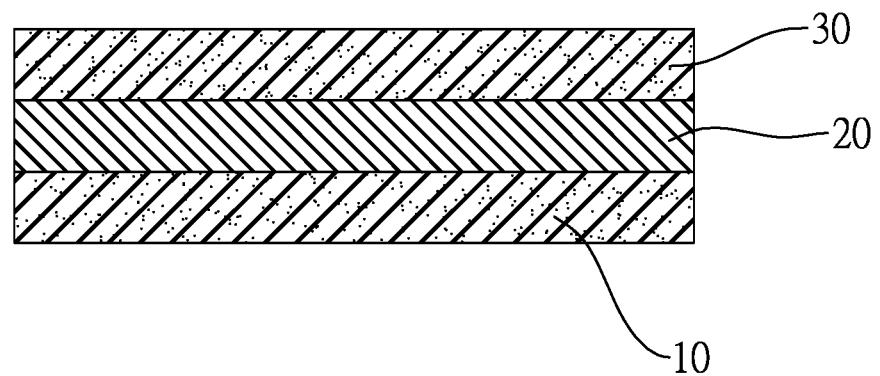
FIG. 2 is a side cross-sectional view of another embodiment of the composite material of the present invention.

As illustrated in FIG. 2, another composite material of the present invention comprises a first carbon fiber layer 10, an intermediate layer 20, and a second carbon fiber layer 30. The intermediate layer 20 is disposed between the first carbon fiber layer 10 and the second carbon fiber layer 30.

The major materials of the first carbon fiber layer 10 are carbon fibers and a first resin selected from PA, PU, TPU, PSU, and PPSU. The carbon fibers are preformed into a first carbon fiber cloth and impregnated with the first resin. The major material of the intermediate layer 20 is liquid crystal polymer fibers. The liquid crystal polymer fibers are preformed into a liquid crystal polymer fiber cloth. The intermediate layer 20 can enhance the bendability of footwear, so it can compensate for the drawback of the carbon fibers, which is highly rigid but low in bendability. The major materials of the second carbon fiber layer 30 are carbon fibers and a second resin selected from PA, PU, TPU, PSU, and PPSU. The carbon fibers are preformed into a second carbon fiber cloth and impregnated with the second resin.

The first carbon fiber cloth and/or the second carbon fiber cloth comprise a UD carbon fiber fabric, a woven fabric, or any combination thereof. The woven fabric is a plain weave cloth, a twill weave cloth with carbon fibers arranged in an intersecting way at an angle of +45/−45 degrees off a reference axis, a twill weave cloth with carbon fibers arranged in an intersecting way at an angle of +60/−60 degrees off the reference axis, and any combination thereof.

When the first and/or the second carbon fiber cloths comprise one or more layers of UD carbon fiber fabric, the first and/or the second carbon fiber cloths have a density of 45 gsm to 160 gsm. When the first and/or the second carbon fiber cloths comprise a woven fabric, the first and/or the second carbon fiber cloths have a density of 160 gsm to 272 gsm.

The first resin is in an amount of 38 wt % to 55 wt % based on the total weight of the first carbon fiber layer. Similarly, the second resin is in an amount of 38 wt % to 55 wt % based on the total weight of the second carbon fiber layer.

The first carbon fiber cloth may further comprise glass fibers, aramid fibers, or any combination thereof. Similarly, the second carbon fiber cloth also may further comprise glass fibers, aramid fibers, or any combination thereof.

The lower and/or upper surfaces of the intermediate layer can be further modified. The modified lower and upper surfaces of the intermediate layer grip the first carbon fiber layer and the second carbon fiber layer well, respectively.

The first carbon fiber layer 10 (i.e., the first carbon fiber cloth impregnated with the first resin), the liquid crystal polymer fiber cloth, and the second carbon fiber layer 30 (i.e., the second carbon fiber cloth impregnated with the second resin) are sequentially disposed in a mold, and then the mold is heated under a specific pressure to obtain the composite material of the present invention. During the heating process, the first resin and the second resin run through and impregnate the liquid crystal polymer cloth to form the intermediate layer 20, which is the liquid crystal polymer fiber cloth impregnated with the first resin and the second resin.

In addition, for meeting the requirement for the appearance of the composite material for footwear, the composite material for footwear may additionally comprise other inorganic fibers or organic fibers. Moreover, the color, shape or characteristics of the composite material for footwear may be adjusted.

Flexing Test

The composite material as illustrated in FIG. 2 (without the resin body 40) is subjected to flexing test in accordance with the standard method of ISO5423 by SATRA TM92. For the traditional shoe materials, cracking occurs after about 70,000 to 100,000 cycles of flexing in average. However, in the composite material as illustrated in FIG. 2, cracking occurs after about 210,000 cycles of flexing in average when the first resin and second resin are TPU; cracking occurs after about 170,000 cycles of flexing when the first resin and second resin are PA; and cracking occurs after about 300,000 cycles or more of flexing when the first resin and second resin are PSU or PPSU. In addition, similar results can be obtained when aramid fibers are added to the intermediate layer 20 in an amount of equal to or less than the amount of the liquid crystal polymer fibers.

In summary, the composite material for footwear of the invention has good wear resistance due to high mechanical strength of the first carbon fiber layer 10 and the second carbon fiber layer 30. Besides, the intermediate layer 20 of the composite material for footwear of the invention has a good cushioning ability, so it can improve the bendability of the whole composite material for footwear. Moreover, because the first carbon fiber layer 10, the intermediate layer 20, and the second carbon fiber layer 30 are enclosed by the resin body 40, the resin body 40 may fix and stabilize the first carbon fiber layer 10, the intermediate layer 20, and the second carbon fiber layer 30, and the resin body 40 can transfer the external force to the first carbon fiber layer 10 and the second carbon fiber layer 30. In addition, to meet the requirements for the appearance of various shoes, the first carbon fiber layer 10, the intermediate layer 20, and the second carbon fiber layer 30 can comprise additional fibers; to conform with the characteristics of footwear for various sports, and the resin body 40 can mix different resins.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A composite material for footwear comprising a first carbon fiber layer, a second carbon fiber layer, and an intermediate layer; wherein
    the first carbon fiber layer is a first carbon fiber cloth impregnated with a first resin, in which the first carbon fiber cloth comprises carbon fibers;
    the second carbon fiber layer is a second carbon fiber cloth impregnated with a second resin, in which the second carbon fiber cloth comprises carbon fibers, and the second carbon fiber layer is disposed above the first carbon fiber layer;
    the intermediate layer is a liquid crystal polymer fiber cloth impregnated with a third resin, in which the liquid crystal polymer fiber cloth comprises liquid crystal polymer fibers; and
    the intermediate layer is disposed between the first carbon fiber layer and the second carbon fiber layer;
    wherein the first resin and the second resin independently comprise a polysulfone resin, a polyphenylene sulfone resin, or any combination thereof, and the first resin is in an amount of 38 percent by weight to 55 percent by weight based on the total weight of the first carbon fiber layer, and the second resin is in an amount of 38 percent by weight to 55 percent by weight based on the total weight of the second carbon fiber layer;
    when the composite material is subjected to flexing test in accordance with the method of ISO5423, cracking occurs after about 300,000 or more cycles of flexing; and
    the intermediate layer further comprises aramid fibers, in which the amount of the aramid fibers is equal to or less than the amount of the liquid crystal polymer fibers.

2. The composite material for footwear as claimed in claim 1, further comprising a resin body, wherein the first carbon fiber layer, the second carbon fiber layer, and the intermediate layer are enclosed by the resin body, and the resin body is composed of a fourth resin comprising a polyamide resin, a thermoplastic polyurethane resin, a polyetherimide resin, a polysulfone resin, a polyphenylene sulfone resin, a polyethylene resin, a polycarbonate resin, an acrylonitrile-butadiene-styrene resin, or any combination thereof.

3. The composite material for footwear as claimed in claim 1, wherein the first carbon fiber layer and the second carbon fiber layer further independently comprise glass fibers, aramid fibers, or any combination thereof.

4. The composite material for footwear as claimed in claim 1, wherein the first carbon fiber cloth and the second carbon fiber cloth independently have a density of 45 grams per square meter to 272 grams per square meter.

5. The composite material for footwear as claimed in claim 1, wherein the third resin comprises the first resin and the second resin.

6. The composite material for footwear as claimed in claim 1, wherein a lower surface and an upper surface of the intermediate layer are independently modified.

7. The composite material for footwear as claimed in claim 1, wherein the first carbon fiber cloth and the second carbon fiber cloth independently comprise a unidirectional carbon fiber fabric, a woven fabric, or any combination thereof.

8. The composite material for footwear as claimed in claim 7, wherein the first carbon fiber cloth and the second carbon fiber cloth independently comprise one or more layers of the unidirectional carbon fiber fabric, in which the directions of carbon fibers in each layer of the unidirectional carbon fiber fabric are the same or different to each other.

9. The composite material for footwear as claimed in claim 7, wherein the woven fabric comprises a plain weave cloth, a twill weave cloth, or any combination thereof.

10. The composite material for footwear as claimed in claim 9, wherein the carbon fibers of the twill weave cloth are arranged at an angle of +45/−45 degrees off a reference axis, at an angle of +60/−60 degrees off the reference axis, or at any combination thereof.

11. The composite material for footwear as claimed in claim 3, wherein the first carbon fiber cloth and the second carbon fiber cloth independently comprise a unidirectional carbon fiber fabric, a woven fabric, or any combination thereof.

12. The composite material for footwear as claimed in claim 11, wherein the first carbon fiber cloth and the second carbon fiber cloth independently comprise one or more layers of the unidirectional carbon fiber fabric, in which the directions of carbon fibers in each layer of the unidirectional carbon fiber fabric are the same or different to each other.

13. The composite material for footwear as claimed in claim 11, wherein the woven fabric comprises a plain weave cloth, a twill weave cloth, or any combination thereof.

14. The composite material for footwear as claimed in claim 13, wherein the carbon fibers of the twill weave cloth are arranged at an angle of +45/−45 degrees off a reference axis, at an angle of +60/−60 degrees off the reference axis, or at any combination thereof.

15. The composite material for footwear as claimed in claim 1, wherein the first carbon fiber cloth and the second carbon fiber cloth independently comprise at least two fabrics selected from the group consisting of: a unidirectional carbon fiber fabric, a plain weave cloth, a twill weave cloth with carbon fibers arranged in an intersecting way at an angle of +45/−45 degrees off a reference axis, a twill weave cloth with carbon fibers arranged in an intersecting way at an angle of +60/−60 degrees off the reference axis, and any combination thereof.

16. The composite material for footwear as claimed in claim 3, wherein the first carbon fiber cloth and the second carbon fiber cloth independently comprise at least two fabrics selected from the group consisting of: a unidirectional carbon fiber fabric, a plain weave cloth, a twill weave cloth with carbon fibers arranged in an intersecting way at an angle of +45/−45 degrees off a reference axis, a twill weave cloth with carbon fibers arranged in an intersecting way at an angle of +60/−60 degrees off the reference axis, and any combination thereof.

* * * * *